United States Patent [19]
Sakakibara

[11] 3,811,418
[45] May 21, 1974

[54] VEHICLE SPEED LIMITING DEVICE
[75] Inventor: Naoji Sakakibara, Kariva, Japan
[73] Assignee: Aisin Seiki Kabushiki Kaisha, Kariya-shi, Aichi-ken, Japan
[22] Filed: May 3, 1971
[21] Appl. No.: 139,461

[52] U.S. Cl............. 123/103 R, 123/102, 123/108, 123/127
[51] Int. Cl. ... F02d 11/08, F02m 13/04, F02d 9/00
[58] Field of Search............ 180/105 R, 105 E, 106, 180/107, 108, 110, 109; 123/123, 103, 102, 198 R, 98 R, 127, 97

[56] References Cited
UNITED STATES PATENTS

| | | | |
|---|---|---|---|
| 2,678,035 | 5/1954 | Uhlenhaut | 123/108 |
| 2,839,148 | 6/1968 | Dowdell | 180/109 |
| 3,081,757 | 3/1963 | Cramer | 180/108 X |
| 3,502,167 | 3/1970 | Baxter et al. | 180/108 |
| 3,596,642 | 8/1971 | Nakata | 123/103 R |

FOREIGN PATENTS OR APPLICATIONS

| | | | |
|---|---|---|---|
| 130,590 | 12/1948 | Australia | 180/105 R |

*Primary Examiner*—Wendell E. Burns
*Attorney, Agent, or Firm*—Holman & Stern

[57] ABSTRACT

A speed-responsive switch coupled to a moving part of a vehicle is closed when the vehicle speed exceeds a predetermined limit to pass a current through an activating circuit including the coil of a solenoid thereby to activate the solenoid, which thereby operates to close a high-speed valve in the high-speed venturi (throat or barrel) of the carburetor of the vehicle engine and thereby to reduce the vehicle speed. When absolutely necessary, as in an emergency, the activating circuit is rendered temporarily inoperative by another switch, thereby permitting the vehicle to be driven at speeds above the limit.

8 Claims, 6 Drawing Figures

PATENTED MAY 21 1974　　3,811,418

VEHICLE SPEED LIMITING DEVICE

BACKGROUND OF THE INVENTION

This invention relates generally to vehicles and to controlling means thereof. More particularly, the invention relates to a new and advanced device for limiting the running speed, particularly the maximum speed, of vehicles and the like.

In recent years there has been an increase in tragic traffic accidents due to excessive driving speeds which tend to accompany improvements in the performances of vehicles and development of high-speed freeways.

SUMMARY OF THE INVENTION

It is an object of this invention to provide an inexpensive vehicle speed limiting device of simple construction for controllably limiting the running speed of vehicles so that the speed will not exceed a predetermined limiting value thereby to prevent accidents due to excessive speeds.

Another object of this invention is to provide a device of the above stated character in which is provided means for rendering the device temporarily inoperative in situations such as emergencies and overtaking other vehicles when it is absolutely necessary to drive at speeds exceeding the limiting value.

According to this invention, briefly summarized, there is provided a device for limiting the speed of a vehicle powered by an engine equipped with a carburetor having at least a first throat or barrel (herein referred to as a first venturi) for relatively low speeds and a second venturi for high speeds, which device comprises actuating means coupled to a high-speed valve in the second venturi and operating when activated to close this high-speed valve to reduce the vehicle speed and speed-responsive means coupled to a moving part of the vehicle indicative of the vehicle speed and operating to activate the actuating means when the vehicle speed exceeds a predetermined limiting value.

According to this invention there is further provided, in the above described vehicle speed limiting device, means operable when absolutely necessary to render the device temporarily inoperative thereby to permit the vehicle to be driven at speeds exceeding said limiting value.

The nature, principle, and utility of the invention will be more clearly apparent from the following detailed description with respect to preferred embodiments of the invention when read in conjunction with the accompanying drawings, in which like parts are designated by like reference numerals.

DETAILED DESCRIPTION OF PREFERRED INVENTIVE EMBODIMENTS

Figure 1:
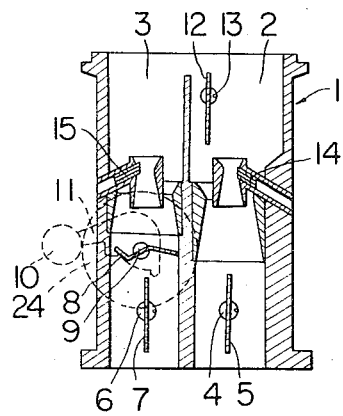
FIG. 1 is a fragmentary elevation, in vertical section, showing the venturis (or barrels) and parts therein of a carburetor of the engine of a vehicle in which one example of the vehicle speed limiting device according to the invention is installed.
Figure 2:
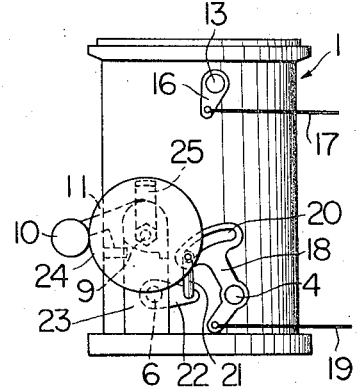
FIG. 2 is a simplified elevation showing the exterior of the venturis shown in FIG. 1 and an example of valve-actuating means of the device of the invention.
Figure 3:
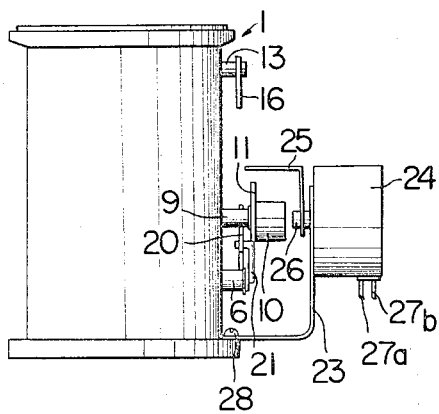
FIG. 3 is an elevation orthogonal to FIG. 2 and shows the venturis and valve-actuating means in FIG. 2 as viewed from the left.

In one example of the invention as illustrated in FIGS. 1, 2, and 3, the carburetor 1 of the engine for driving the vehicle to which the invention is applied has a first throat or barrel (herein referred to as a "first venturi") 2 for relatively slow speeds and a second throat or barrel (herein referred to as a "second venturi") 3 for high speeds. These first and second venturis 2 and 3 are respectively provided therewithin, at positions downstream from their throat sections with first and second throttle valves 5 and 7 respectively fixed to and supported by throttle shafts 4 and 6, extending through and out of the venturi walls. The venturis 2 and 3 are further provided therewithin at their throats with fuel nozzles 14 and 15.

The second venturi 3 has therewithin, at a point upstream from the throttle valve 7, a high-speed valve 8 fixed to and supported by a valve shaft 9 extending through and out of the venturi wall. A balancing weight 10 fixed to the distal end of an arm 11, which is fixed at its proximal end to the outer end of the shaft 9 is provided for adjustment of the angular position of the shaft 9, that is, the degree of opening of the high-speed valve 8.

The first venturi 2 has therewithin, at a point near the upstream end thereof, a choke valve 12 for adjustment of the flowrate of the air inducted into the first venturi 2. The choke valve 12 is fixed to and supported by a shaft 13 extending through and out of the venturi wall and fixed at its outer end to the proximal end of a lever 16. The distal end of the lever 16 is linked by a control wire 17 to a choke button or knob (not shown).

The outer end of the above mentioned throttle shaft 4 of the first throttle valve 5 supports a lever 18 fixed thereto. The lever 18 has an arm with a distal end linked by a control wire 19 to an accelerator pedal (not shown). The lever 18 has another arm provided at its distal end with an arcuate slot 20 engaged with a pin fixed perpendicularly to the upper end of a link rod 21. The lower end of this rod 21 is pin connected to the distal end of a lever 22 fixed at its proximal end to the aforementioned throttle shaft 6 of the second throttle valve 7.

An L-shaped bracket 23 fixed at its lower end by screws 28 to a flange at the downstream end of the venturis supports a rotary solenoid 24 having a rotating shaft 26 and receiving electrical power supply through lead wires 27$_a$ and 27$_b$. One end of an L-shaped member 25 is fixed to and supported by the shaft 26. When electric power is supplied to the solenoid 24, the shaft 26 rotates in the counter-clockwise direction as viewed in FIG. 2, whereby the member 25 rotates in the same direction, and its outer free end contacts the aforementioned arm 11 of the balancing weight 10 and rotates the same to the position indicated in FIG. 2 thereby to close the aforementioned high-speed valve 8.

Figure 4:
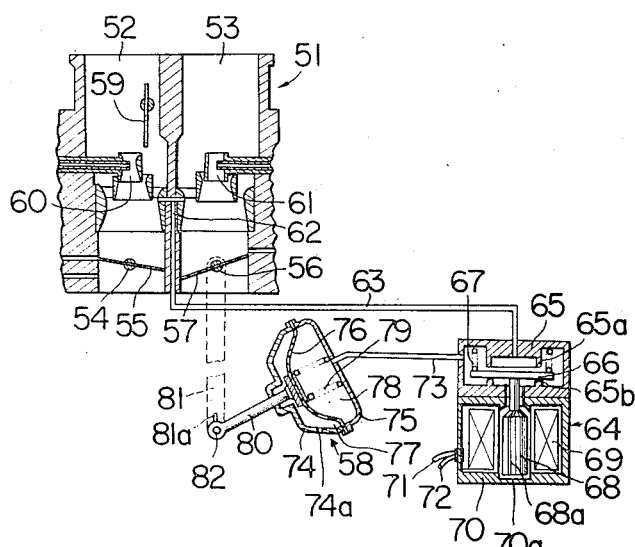
FIG. 4 is a partly fragmentary elevation, in vertical section, showing another example of the device of this invention.

In another example of this invention as illustrated in FIG. 4, the invention is applied to a carburetor 51 having a first venturi 52 for relatively low speeds and a second venturi 53 for high speeds, which are respectively provided therewithin with first and second throttle valves 55 and 57 respectively fixed to and supported by throttle shafts 54 and 56 extending through and out of the venturi walls. The first throttle valve 55 is linked by a mechanism (not shown) to an accelerator actuatable by the operator or driver to open and close the first throttle valve. The second throttle valve (high-speed valve) 57 is linked to a vacuum cylinder or vacuum motor 58 of diaphragm type as described hereinafter and closed thereby in proportion approximately with the vehicle speed at speeds above a predetermined speed.

A choke valve 59 is provided in the first venturi 52, and the venturis 52 and 53 are provided therewithin with fuel nozzles 60 and 61. Between the fuel nozzles 60 and 61, that is, at the throats of the venturis 52 and 53, there is provided a port 62 for obtaining negative pressure varying in accordance with the engine speed, this port 62 being communicatively connected by a conduit pipe 63 to an electromagnetic changeover valve 64.

This electromagnetic changeover valve 64 comprises, essentially, a valve housing 65, opposed and spaced apart valve seats $65_a$ and $65_b$ fixed to and supported by internal parts of this housing, a valve plate 66 adapted to engage selectively with either of the valve seats $65_a$ and $65_b$, a compression spring for urging the valve plate 66 continually toward the valve seat $65_b$, a casing 70 co-axially attached to the valve housing 65, a solenoid coil 69 housed within the casing and provided with lead wires 71 and 72 for supplying energizing power thereto, and a plunger 68 installed within the coil 69 in a manner to undergo reciprocating movement therein and having an extended end in contact with the face of the valve plate 66 opposite that of the spring 67.

The plunger 68 is provided longitudinally along its outer surface with a groove $68_a$ for passage of air, and the casing 70 is provided with a vent hole $70_a$ for passage of air from the atmosphere to the groove $68_a$. The interior of the housing 65 of this electromagnetic changeover valve 64 is communicated by a conduit pipe 73 to the vacuum chamber 78 of the aforementioned vacuum motor 58.

The vacuum motor 58 has a housing formed by two cup-like halves 74 and 75, clamping therebetween the periphery of a diaphragm 76, which thereby divides the housing into two chambers 77 and 78. The above mentioned conduit pipe 73 communicatively connects the interior of the housing 65 of the electromagnetic valve 64 to this chamber 78. The chamber 77 is in communication with the atmosphere by way of a vent hole $74_a$ in the housing half 74. The diaphragm 76 is continually urged toward the chamber 77 (leftward and downward as viewed in FIG. 4) by a compression spring 79.

An actuating rod 80 is fixed at one (the inner) end thereof to the center of the diaphragm 76 and extends outward through a central hole in the housing half 74. The outer end of this rod 80 is connected by a pin 82 to a longitudinal slot $81_a$ in one end of a link 81 connected at the other end thereof to the aforementioned throttle shaft 56 of the second throttle valve (high-speed valve) 57.

Figure 5:
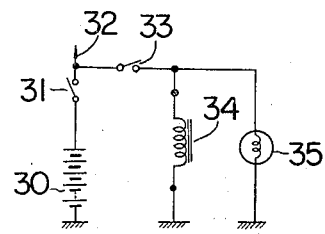
FIG. 5 is a schematic diagram showing one example of an electrical circuit for actuating the device of this invention.

In an example of a electrical system for actuating the device of this invention as illustrated in FIG. 5, the essential components are a power source 30, an ignition switch 31, wiring 32 for supplying power to components such as an ignition coil, a speed responsive switch 33 intercoupled with the vehicle speedometer, for example, so as to close when the vehicle speed reaches a predetermined maximum limit, and a solenoid coil 34 corresponding to the coil of the aforedescribed rotary solenoid 24 shown in FIGS. 1 and 3 or the solenoid 69 of the changeover valve 64 shown in FIG. 4. A warning lamp 35 for indicating excessive vehicle speed to the driver is connected in parallel with the solenoid coil 34 to the switch 33.

Figure 6:
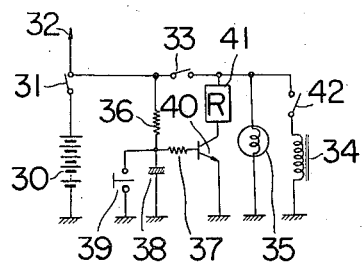
FIG. 6 is a schematic diagram showing another example of an electrical circuit according to the invention.

The above described electrical system may be modified by adding thereto, as indicated in FIG. 6, resistors 36 and 37 a capacitor 38, a switch 39 for disconnecting the operation of speed-limiting device, a transistor 40, a relay 41, and a normally-open contact 42 of the relay 41 with wiring connections as shown.

The speed-limiting device of the above described organization according to this invention operates as described below.

In the case where the electrical system shown in FIG. 5 is used in conjunction with the mechanism shown in FIG. 1, the speed-responsive switch 33 closes when the vehicle, during running operation, exceeds the predetermined limiting speed. Consequently, the warning lamp 35 is lit to indicate excessive speed, and, simultaneously, electric current flows through and energizes the solenoid coil 34, whereupon the shaft 26 of the rotary solenoid 24 and the L-shaped member 25 fixed thereto rotate in the counterclockwise direction (as viewed in FIG. 2).

As a result, the member 25 engages the arm 11 fixed to the shaft 9 of the high-speed valve 8 and rotates this arm 11 in the counterclockwise direction thereby to close the high-speed valve 8. Consequently, the air-fuel mixture is supplied to the engine through only the first venturi 2, no mixture being supplied through the second venturi 3, whereby the vehicle speed drops and is thus held within the limiting speed.

When the vehicle speed becomes less than the limiting speed, the switch 33 opens. Consequently, the warning lamp 35 is extinguished, and, simultaneously, the current through the coil of the rotary solenoid 24 is cut off, whereby the high-speed valve 8 returns to its position for normal running.

Next, in the case where the electrical system shown in FIG. 6 is used, the speed-responsive switch 33 closes similarly as described above when the vehicle speed exceeds the limit. Consequently, the warning lamp 35 is lit, and, simultaneously, the capacitor 38 is amply charged through the resistor 36. Since the base potential of the transistor 40 is at a value sufficient for conductivity of the transistor, the relay 41 operates, its normally-open contact 42 closing to pass current through the solenoid coil 34. Consequently, the high-speed valve 8 is closed, and the vehicle speed is caused to decrease as described hereinbefore.

However, in the case where a speed above the limit is absolutely necessary at this time for passing another vehicle or for an emergency, the switch 39 for disconnecting the speed-limiting device, which switch is adapted to be closed, for example, at the "kick-down" position of the accelerator (not shown), is closed. Accordingly, the charge in the capacitor 38 is released through short-circuiting by the switch 39, whereby the base potential of the transistor 40 decreases, and the current flowing between the collector and emitter of this transistor 40 is interrupted. Consequently, the relay 41 is rendered inoperative, its normally-open contact 42 returning to its open position, and the current to the solenoid coil 34 is cut off, whereby the vehicle can be driven at speeds above the limiting speed.

At this time, however, the warning lamp 35 remains lit. Furthermore, the switch 39 for disconnecting the speed-limiting device needs to be depressed only temporarily, and the speed-limiting device returns automatically to its operative state after the elapse of a certain time lag due to a delay circuit formed by the resistor 36 and capacitor 38.

In the case where the mechanism shown in FIG. 4 is used in conjunction with the electrical system illustrated in FIG. 5, the closing of the speed-responsive switch 33 when the vehicle speed exceeds the limit causes the warning lamp 35 to be lit and, simultaneously, a current to pass through and energize the solenoid 69. Consequently, the plunger 68 and the valve plate 66 are forced upward, against the bias of the spring 67, until the valve plate 66 is seated against the valve seat $65_a$ of the housing 65, shutting off the communication between the conduit pipes 63 and 73 and communicating the pipe 73 with the vent hole $70_a$ to the atmosphere. Consequently, the difference between the pressures in the two chambers 77 and 78 of the vacuum motor 58 becomes zero, and the throttle valve 57 (high-speed valve) is closed, whereby the vehicle speed is reduced and held below the limiting speed.

When the vehicle speed drops below the limit, the speed-responsive switch 33 opens. The warning lamp is extinguished, and, at the same time, the current through the solenoid 69 is interrupted. The valve plate 66 thereby shuts off the communication between the atmosphere and the chamber 78 of the vacuum motor 58 as indicated in FIG. 4 and establishes communication between the vacuum region of the carburetor 51 and the chamber 78. Consequently, the diaphragm 76 is drawn toward the chamber 78, whereby the second throttle valve 57 (high-speed valve) is opened. Thus, the carburetor 51, and speed-limiting device are returned to the normal running state.

A description of the case where the mechanism of FIG. 4 is used in conjunction with the electrical system indicated in FIG. 6 is omitted since it would be equivalent to a partial combination of the descriptions of the case where the mechanism of FIG. 1 and the circuit of FIG. 6 are used and the case where the mechanism of FIG. 4 and the circuit of FIG. 5 are used.

In accordance with this invention as described above, there is provided a speed-limiting device whereby accidents and dangerous situations which are liable to be caused by excessive driving speeds due to inadvertence on the part of the driver can be effectively prevented. Furthermore, in situations such as sudden happenings and emergencies, the speed-limiting device can be temporarily rendered inoperative. These and other advantageous features can be attained by a device according to this invention of very simple and inexpensive construction.

Moreover, in the event of malfunctioning of the device of this invention, the vehicle can be driven in a state which does not differ at all from that of a vehicle wherein the device of this invention is not used, or the state of the vehicle merely becomes such that the speed cannot be increased excessively. Accordingly, the device of this invention imposes no disadvantage whatsoever on the vehicle performance but always maintains it on the safe side.

I claim:

1. A vehicle travelling-speed limiting device for a vehicle powered by an engine equipped with a carburettor having at least a first venturi for relatively slow speeds and a second venturi for high speeds, said first and second venturies having first and second throttle valves respectively, said carburettor having a high speed valve, the device comprising:

actuating means coupled to said high speed valve and operating to close said high speed valve to reduce the vehicle travelling speed, said actuating means comprising a vacuum motor with an output rod coupled to said high speed valve, a changeover valve for selectively establishing communication between said vacuum motor and ambient atmosphere and alternatively to a vacuum region at throat sections of said first and second venturies, and a solenoid having an electromagnetic coil and plunger activated by said coil and coupled to said changeover valve;

speed responsive means coupled to a moving part of the vehicle for sensing the travelling speed of the vehicle and operating to energize said actuating means when the vehicle travelling speed exceeds a predetermined limiting valve.

2. A vehicle speed limiting device as claimed in claim 1 wherein said speed responsive means comprises an electrical power source, said electromagnetic coil and a speed responsive switch coupled to said moving part of the vehicle, said power source supplying power through said coil when said speed responsive switch is closed thereby to energize said solenoid.

3. A vehicle speed limiting device according to claim 1 in which said high-speed valve is installed in the second venturi, at a position downstream from a throat section thereof, in addition to said second throttle valve.

4. A vehicle speed limiting device according to claim 1 in which said high-speed valve is disposed said second venturi.

5. A vehicle speed limiting device according to claim 1 in which said actuating means comprises a solenoid having an electromagnet coil and operating to produce an output and a mechanism for transmitting said output to the high-speed valve to operate the same, and said speed-responsive means comprises an electrical power source, said electromagnet coil, and a speed-responsive switch coupled to said moving part of the vehicle, said power source supplying power through said coil when said switch is closed thereby to activate the solenoid.

6. A vehicle speed limiting device according to claim 1 in which there is provided means operable in an emergency to render the speed limiting device temporarily inoperative thereby to permit the vehicle to be driven at speeds exceeding said predetermined limiting value.

7. A vehicle speed limiting device according to claim 1, wherein a warning lamp is connected in parallel with said electromagnet coil so as to provide a warning indication when the vehicle travelling speed exceeds said predetermined value.

8. A vehicle speed limiting device according to claim 2, wherein said speed responsive means further includes means operable in an emergency so that, even though said speed-responsive switch remains closed during an excessive vehicle travelling speed, said electromagnet coil is de-energized thereby temporarily over-ruling the vehicle speed limiting device.

* * * * *